April 7, 1936.  A. D. FORBES  2,036,264

MOTOR CONTROL SYSTEM

Filed Oct. 31, 1933  2 Sheets-Sheet 1

WITNESSES:
Leon J. Faza
Wm. C. Groome

INVENTOR
Allan D. Forbes
BY
W. R. Coley
ATTORNEY

April 7, 1936.  A. D. FORBES  2,036,264

MOTOR CONTROL SYSTEM

Filed Oct. 31, 1933   2 Sheets-Sheet 2

INVENTOR
Allan D. Forbes
BY
ATTORNEY

Patented Apr. 7, 1936

2,036,264

UNITED STATES PATENT OFFICE 2,036,264

MOTOR CONTROL SYSTEM

Allan D. Forbes, Wilkinsburg, Pa., assignor to Westinghouse Electric & Manufacturing Company, East Pittsburgh, Pa., a corporation of Pennsylvania Application October 31, 1933, Serial No. 696,031

12 Claims. (Cl. 172—288)

My invention relates generally to control systems and more particularly to control systems that may be utilized for operating electric motors.

An object of my invention is the provision of a control system of the class indicated that shall be simple in organization, reliable in operation, and which may be readily and economically manufactured and installed.

Another object of my invention is to control the operation of a direct-current motor when connected to a source of alternating current by the use of electromagnetic and electronic discharge devices also interconnected with the source of alternating current.

A further object of my invention is to provide improved speed characteristics of a motor by the use of special control means for governing electronic discharge devices which control the operation of a motor.

A more specific object of my invention is to prevent improper operation of electronic devices utilized for controlling the operation of a direct-current motor when energized from a source of alternating-current energy when such motor is subjected to load greater by a predetermined amount than its normal load, and to maintain the motor speed at a substantially constant value when the load on the motor varies below said predetermined amount.

Figure 1:
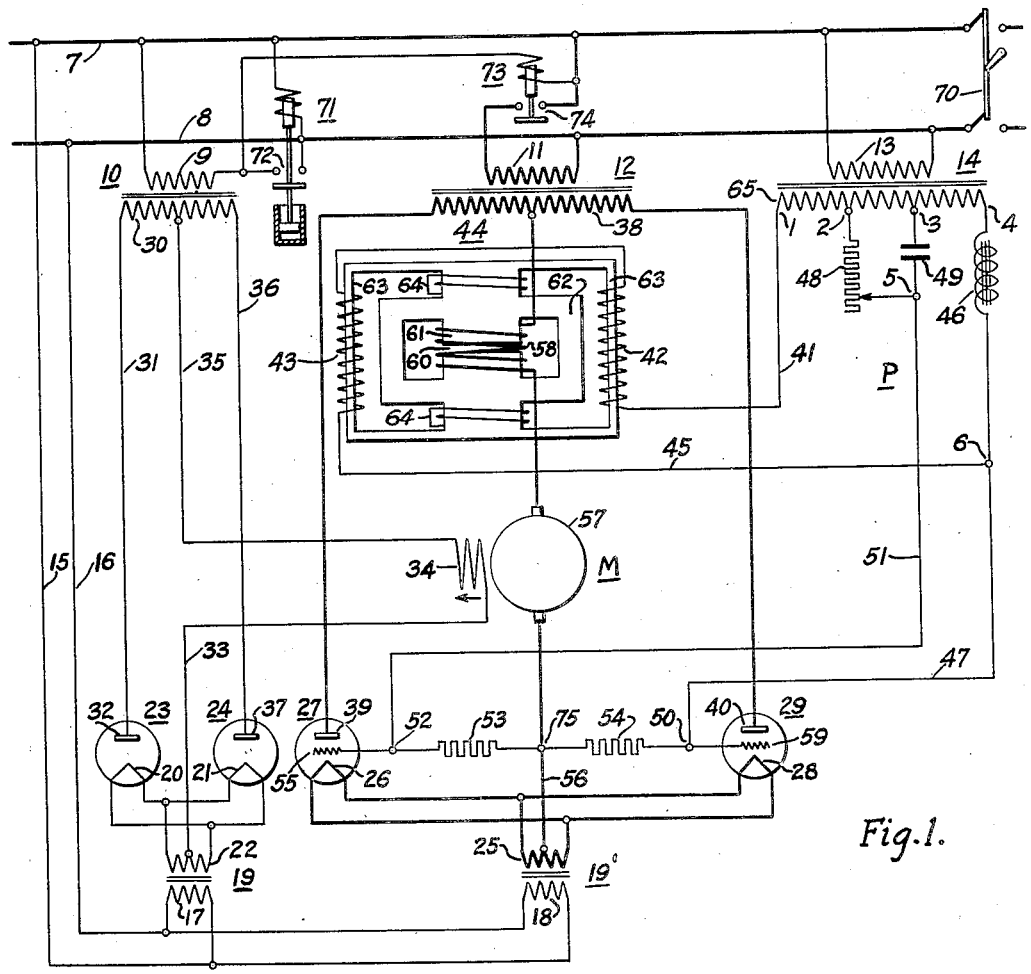
Figure 2:
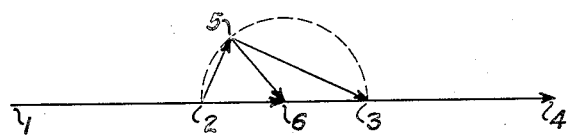
Figure 3:
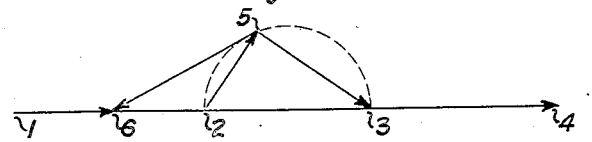

Additional objects of this invention and the novel and useful features thereof will become more apparent from a study of the following specification, particularly when such study is made in conjunction with the accompanying drawings, in which:

Figure 1 is a diagrammatic view of a control system embodying the features of my invention, Figs. 2 and 3 are vector diagrams illustrating the theory of operation of my invention, and Figs. 4 to 8, inclusive, are graphical representations of the changing electrical characteristics of a gas-filled grid-controlled power tube for different phase positions of the grid potential relative to the anode potential and for different values of counter-electromotive force of the motor being controlled.

With particular reference to Fig. 1, my invention includes, primarily, a motor M having a field winding 34 and an armature 57, a transformer 12 having a primary winding 11 and a secondary winding 38 and a pair of gas-filled grid-controlled tubes 27 and 29, which are provided for connecting the armature 57 of the motor M and a reactor 46 in circuit relation with the secondary transformer winding 38.

The field winding 34 may be energized from a suitable source of direct current or, what may be more preferable, when only alternating current is available, may be energized from the alternating current busses 7 and 8 through suitable asymmetric units or rectifiers such as 23 and 24 connected intermediate busses 7 and 8 and the field winding 34.

In this particular embodiment, I have shown the field winding 34 as energized to a substantially constant value as follows: Asymmetric units 23 and 24 are provided, respectively, with filaments or cathodes 20 and 21 and with anodes 32 and 37. A transformer 10 has its primary winding 9 connected to alterating current busses 7 and 8 by means of contact members 72 of contactor 71. The outer terminals of its secondary winding 30 are connected to the anodes 32 and 37 by means of conductors 31 and 36, respectively. The filaments 20 and 21 are connected in parallel relation to the secondary winding 22 of a transformer 19. The primary winding 17 of transformer 19 is connected to busses 7 and 8 by conductors 15 and 16.

Since asymmetric devices 23 and 24 together act merely as a full wave rectifier, the field winding is energized with unidirectional current. For instance, if the current in the secondary winding 30 for one half cycle be considered as flowing from right to left, current will flow through conductor 31, anode 32, cathode 20, the secondary winding 22, conductor 33, through the field winding 34 in the direction indicated by the arrow adjacent the field winding, and conductor 35 to the mid-tap of the secondary 30 of transformer 10.

For the second half of the cycle current flows from the right-hand terminal of secondary 30 of transformer 10 through conductor 36, anode 37, cathode 21, the secondary winding 22 of transformer 19, conductor 33, through the field winding 34 in the same direction as for the first half of the cycle, and conductor 35 to the mid-tap of the secondary winding 38 of the transformer 10. From the foregoing arrangement, it is obvious that the field winding 34 is excited from the source of alternating current as effectively as if direct current were utilized.

It should be noted that the power-grid-glow tubes 27 and 29 have their respective filaments or cathodes 26 and 28 energized to a substantially constant value from the secondary winding 25 of a transformer 19'. The primary winding 18 of transformer 19' is connected to the energized conductors 15 and 16.

To energize the circuits and the filaments of the electronic devices 23, 24, 27 and 29 before the armature 57 of the motor M is energized, a time limit switch 71, having its actuating coil connected across the busses 7 and 8, is disposed to energize the primary 9 of transformer 10 at the end of a predetermined interval of time after the closing of switch 70. Operation of time limit contactor 71 i. e. the closing of contact members 72, energizes contactor 73 which thereupon closes its contact members 74 and thus energizes primary winding 11. Since the closing of a line switch 70 energizes the busses 7 and 8 from any suitable source, the filaments of all of the electronic devices 23, 24, 27 and 29 initially become fully heated and the grids 55 and 59, for electronic devices 27 and 29, respectively, discussed more in detail hereinafter, are thus subject to a control voltage before transformer 12 can supply voltage to the motor M and before transformer 10 can energize the field 34. This arrangement prevents damage to the electronic devices by effecting an appropriate heating of the filaments before such devices are called upon to carry a load.

The power tubes 27 and 29 are essentially gas-filled grid-controlled discharge tubes and comprise, respectively, anodes 39 and 40, and cathodes or filaments 26 and 28, which are generally called the conducting electrodes, and grids 55 and 59, which are usually termed the control electrodes. Inasmuch as power grid-glow tubes having the property of rectifying alternating current, I provide for utilizing two of them in order to give double-wave rectification. However, it will be readily understood that my invention is operable by using only one grid-controlled tube.

The power tubes 27 and 29 are preferably of the well-known type wherein the cathode comprises a filament surrounded by an inert gas. The filament when electrically heated by a suitable source of current, liberates primary electrons which are necessary for the functioning of the tube. When a potential difference is applied between the anode and cathode, the anode being at a high potential, and the grid potential being above the critical (ionization) potential, the liberated electrons move towards the anode. As these electrons acquire sufficient velocity, they collide with the molecules of gas and produce both new electrons and positive ions. As the primary electrons and the newly formed electrons move toward the anode they have to pass the grid structure.

The grid may be charged either by a positive or a negative potential and, therefore, helps either to accelerate or retard the movements of the passing electrons. Hence, the grid is such as to control the value of the anode-cathode potential at which the gas becomes ionized, or at which an arc is formed for the passage of a current between the anode and cathode. For convenience, and in accordance with engineering parlance, the potential of the grid will hereinafter be considered with reference to the potential of the cathode. For a given anode potential, there is a definite critical grid potential at which ionization occurs, thus allowing the tube to pass current in the form of an electric arc. See Figs. 4 to 8, inclusive, which are explained in detail later.

If the potential of the grid is below this critical grid potential, no discharge occurs, and accordingly, no current passes between the anode and the cathode. On the contrary, if the potential of the grid rises above the critical grid potential, even if only for a moment, a discharge immediately occurs and current passes in the form of an electric arc between the anode and cathode. After the arc is started, the ionized gas prevents the formation of a space charge and the arc is continued. Consequently, the grid of a gaseous discharge tube is effective only in preventing an arc or initiating an arc, but is not effective to extinguish the arc after it has once been started. The grid, however, regains control if the flow of current between the anode and cathode ceases momentarily, thus allowing the gas to deionize and thereby to reestablish the space charge or "sheath" at the grid. Therefore, by applying an alternating-current voltage to the anode and cathode, the grid has an opportunity of regaining control once every cycle and can delay the starting of an arc for as long a time during the cycle as the potential of the grid is below the critical grid potential.

For controlling the current flow through grid-controlled gas-filled tubes, three fundamental methods, well known in the art, are available. In the first or "magnitude" method, the phase relation of the grid potential relative to the anode potential remains fixed, but the magnitude of the grid potential varies relative to the anode potential to thus control the current that may pass between the anode and the cathode. In the second or "phase shifting" method, the magnitude of the grid potential usually remains substantially fixed relative to the anode potential although it may also vary somewhat, but the phase relation of the grid potential relative to the anode potential is shifted, thereby controlling the current passing between the anode and the cathode. The third method embodies a combination of the "magnitude" and the "phase-shifting" methods. In the practice of my invention, I prefer the "phase-shifting" method and practice this method in a special manner.

When using the "phase-shifting" method to control the grid potential of a tube or tubes utilized to control the speed of a direct-current motor supplied with energy from a source of alternating current, a severe duty is imposed on the tube or tubes particularly when the motor is starting. This severe duty or demand on the tubes is especially serious when the armature is at rest and more particularly when the motor is loaded and the armature circuit of the motor and associated control circuits are set to apply full voltage to the motor. It is, therefore, very desirable to have some automatic, yet simple, means of accelerating the motor slowly, thus preventing excessive current flow through the tube. The time-limit contactor 71 in some measure secures such protection, but in addition to this time-limit protection, which is usually provided and forms no part of my present invention, I provide for slowly and automatically accelerating the motor so long as the load on the motor is not above a certain value.

A study of Fig. 1, since the power electric discharge devices 27 and 29 act as rectifiers, shows that, for one part of the cycle, current would be supplied from the left-hand terminal of the secondary 38 of the transformer 12 through the conducting electrodes 39 and 26 of the power tube 27, the secondary 25 of the transformer 19′, conductor 56, armature 57 and coil 58 of the reactor 44 to the mid-tap of the secondary 38 of the transformer 12; while for the second half of the cycle, the current would flow from the right-hand terminal of the secondary 38 through the conducting electrodes 40 and 28 of the power tube 29, the secondary 25 of transformer 19' and then through the motor M in the same direction as for the first part of the cycle. The average current flowing through the motor armature is, of course, determined by the bias on the grids of the respective power tubes.

The phase shift circuit for controlling the grid bias of the tubes is generally indicated at P and includes a pair of reactors 46 and 44, a capacitor 49 and a variable resistor 48. By changing the resistance value of the variable resistor, the grid bias of the power tubes may be changed, thereby controlling the speed of the motor as desired.

The phase shift circuit P is, however, by no means of conventional design. The circuit P includes among other elements, a transformer 14 having a primary winding 13 connected across busses 7 and 8, and a secondary winding 65 having terminals 1 and 4, and a pair of reactors 46 and 44 which are connected to the outer terminals of the secondary 65. The reactors have their terminals that are not connected to the secondary connected to a common junction 6. The variable resistor 48 is connected to the secondary at an intermediate point 2 and the condensor or capacitor 49 is connected to the secondary at a second intermediate point 3. The terminals of the resistor 48 and capacitor 49 not connected to the secondary are connected to a common junction 5.

A pair of resistors 53 and 54 are connected to a junction 75 on the armature lead or conductor 56, and have their other terminals connected to the grids 55 and 59 of tubes 27 and 29, respectively. A conductor 51 leads from junction 5 to a junction 52 intermediate resistor 53 and grid 55, and a conductor 47 leads from junction 6 to a junction 50 intermediate resistor 54 and grid 59.

These two reactors 44 and 46 are designed to have the same impedance when there is no current flowing in the armature 57 of the motor M, in which case the voltage vector diagram of the phase shift circuit would be as indicated in Fig. 2, namely, the voltage from terminal 1 of transformer secondary 65 to junction 6 would be represented by the vector 1—6 and the voltage from the junction 6 to terminal 4 by the vector 6—4. The voltage from tap 2 to junction 5 would be represented by the vector 2—5 and the voltage from the junction 5 to tap 3 is represented by the vector 5—3. When the reactance of the two reactors 44 and 46 is of the same value, the end of the vector 1—6 must necessarily be at the point indicated for 6 in Fig. 2 and the phase angle of the grid bias is thus represented by the vector 5—6. By variation of the resistance value of the variable resistor 48, the point 5 may be shifted along the semi-circle shown in Fig. 2 and the speed of the motor may thus be varied at will.

The reactor 44 is, however, of unique and special design. An exciting coil 58 surrounds the central portion or leg 61 of the magnetic circuits of the reactor. This portion 61 is of such dimensions that the intermediate legs 62 and outer legs 63 become saturated long before the leg 61 becomes saturated. Further, the middle leg 61 is provided with an air gap 60 to provide a uniform distribution of the flux and otherwise improve the operating characteristics of the reactor 44. Leg 61 is also provided with short circuited upper and lower windings 64 to dampen out the effect of the pulsations of the unidirectional current in coil 58.

The intermediate legs 62 are designed to have such dimensions that these legs would not become very materially saturated during normal variations of armature current of the motor. However, when the armature current of the motor increases to an abnormal value, as it does during acceleration when starting from rest or as it does when suddenly heavily loaded during operation, the flux changes first cause saturation of the smaller-reluctance legs 62. Only after a saturation of legs 62 is there a saturation of the greater reluctance legs 63. It is thus apparent that normal variations of the current in coil 58, namely, normal variations of the armature current, cause no very material change in the reactance of coils 42 and 43, which are disposed on the outer legs 63 of the reactor 44 and are connected across secondary 65 and reactor 46. That is, so long as the armature current variations are within the desired limits, the flux variations in the outer or greater-reluctance legs 63 are relatively small, but when there is an abnormal variation, the flux density in the outer legs 63 varies rapidly and by a considerable amount, and legs 63 become saturated very suddenly. It is thus obvious that the reactance of the circuit through conductor 41, reactor coils 42 and 43 of the reactor 44 and conductor 45 very materially decreases with regard to the reactance of the reactor 45. The effective impedance between junctions 1 and 6 of the secondary 65 of transformer 14 and junction 5 is very materially and suddenly decreased. Since conductor 47 connects junctions 6 and 50 the bias on the grids 55 and 59 is rapidly changed. That is, the phase position of the grid voltage is shifted from the position it had before the abnormal change took place to a position out of phase by a great amount.

In terms of a showing of a vector diagram, the theory of operation is substantially as follows: With variations of the armature current, that is, an increase of armature current, the impedance of the circuit through the reactor 44 decreases and in consequence the voltage vector for the secondary 65 of the transformer 14 from terminal 1 to junction 6 becomes shorter and is designated by the vector 1—6 in Fig. 3, whereas the other vectors are also changed as shown in Fig. 3. Since the vector 5—6 still represents the grid voltage and its angle of lag is now much greater than before, the average output of the power tubes 27 and 29 is much less. The length of the vector 2—5 can be changed at will but it is obvious that such change will not very materially change the angular position of the vector 5—6.

Figure 4:
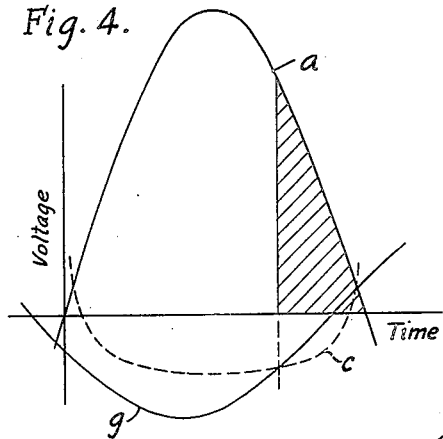

Fig. 4 for instance, shows graphically the variation of the anode voltage, designated by the curve a and the phase position of the grid voltage designated by the curve g, during the initial stages of starting when there is no counter-electromotive force. The dotted line curve c designates the critical grid voltage for the particular type of power tubes utilized. The shaded portion indicates the current passing through the armature of the motor.

Figure 5:
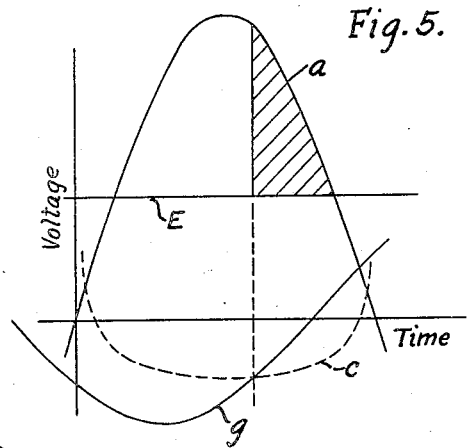

Fig. 5 designates a second stage in the starting cycle showing how the counter-electromotive force has risen and how the grid potential was shifted automatically by the phase shift circuit P, so that the shaded portion is still of considerable area. The area is, however, less in Fig. 5 than it is in Fig. 4.

Figure 6:
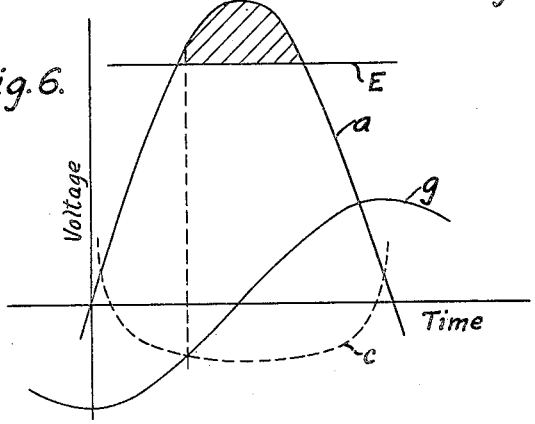

Fig. 6 shows the full speed operation, showing how the counter-electromotive force operates to limit the current passing through the armature circuit and what position the grid voltage takes during normal operation. From a study of Figs. 4, 5 and 6, it is obvious that the low output voltage of the power tubes, if the motor is starting as was assumed, will produce a gradual and smooth or continuous automatic acceleration of the motor.

The specially designed reactor 44 is provided to prevent the armature current from reducing the motor speed and, thereby giving poor speed regulation except when the power tubes are in danger of being overloaded. During normal variations of armature current, the impedance of the reactor 44, that is, of the reactor coils 42 and 43, is not very materially affected except when the armature current attains a critical value which might endanger the tubes 27 and 29. When such abnormal change takes place, the impedance of the reactor 44 drops suddenly and very materially, thereby shifting the grid voltage out of phase a greater amount than the phase position it had previous to such change, and the armature current is thus forcibly decreased.

Figure 7:
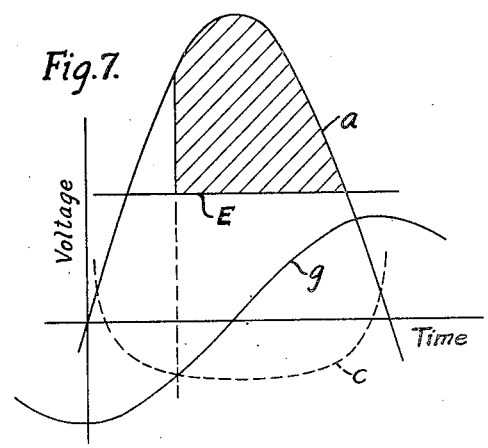
Figure 8:
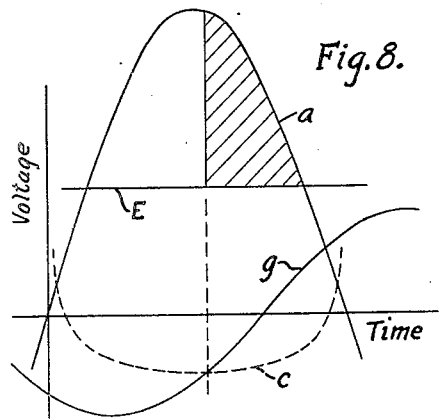

This latter operation may be visualized by a study of Figs. 7 and 8. Fig. 7 shows, somewhat hypothetically, what the current value through the tubes would be if a sudden load is thrown on a motor when it is operating at normal speed. The shaded portion in Fig. 7 designates a current value which would destroy the tubes but actually, no matter how rapidly and heavily a motor may be loaded, the phase position of the grid voltage is so rapidly changed through the use of my invention to a position such as shown in Fig. 8 that the current through the tubes cannot rise very materially. The shaded portion in Fig. 8 shows more nearly what such current value would be. That is, the shaded portion in Fig. 8 is comparable in area to the shaded portion in Fig. 4 during the starting operation.

I am, of course, aware that others skilled in the art after having the benefit of the teachings of my invention can devise other circuit diagrams and provide other means than those hereinbefore specified for accomplishing the results herein pointed out. I do not wish, therefore, to be limited to the specific details herein disclosed but desire that no greater limitations be imposed upon my invention than are necessitated by the prior art and the scope of the claims hereto appended.

I claim as my invention:

1. In a system of control for a motor, in combination, a motor having an armature winding and a field winding, electronic discharge devices interconnected with said armature winding for controlling the acceleration of the motor, and electromagnetic means, interconnected with said armature winding to be responsive to only abnormal armature currents of the motor, and controlling the electronic discharge devices to limit the current passing through said electronic discharge devices.

2. In a system of control for a motor, in combination, a direct current motor having an armature and a field winding, a source of alternating current, electronic discharge devices adapted to energize the said motor field winding to a substantially constant value, electronic discharge devices for controlling the current passing through the armature of said motor to control the acceleration and speed thereof, and control means designed to be responsive to abnormal changes in armature current to limit said armature current to a certain range of values to thus control only acceleration of said motor.

3. In a system of control for a motor, in combination, a direct-current motor having an armature winding and a field winding, means for energizing said field winding to a substantially constant value, a source of alternating current, asymmetric units disposed to supply direct current to the armature of said motor from said source of alternating current, and electromagnetic means, designed to be responsive to abnormal changes only in armature current, adapted to control said asymmetric units to limit the current that may pass through said armature.

4. In a system of control for a motor, in combination, a motor having an armature winding and a field winding, means for energizing the field winding with direct current to a substantially constant value, a source of alternating current, electronic discharge means for controlling the armature current of the motor, grid means for controlling the operating characteristics of the electronic discharge means, phase shift means for shifting the phase position of the potential of said grid means relative to the potential of said source of alternating current, and control means, responsive only to an abnormal rise in armature current of said motor, for controlling said phase shift means.

5. In a system of control for a dynamo-electric machine, in combination, a source of electrical energy, a pair of electric circuits, a dynamo-electric machine disposed to be energized from said pair of circuits, electronic means in said circuits for controlling the energy supplied to said machine, a reactor coil connected to control said electronic means, and three paths in magnetic circuits dimensioned to become successively saturated with variations of the energy demand of said machine, said reactor coil being disposed on the path second to become saturated, whereby the energy transmitted by said electronic devices to said machine is kept below a certain value.

6. In a system of circuits for transmitting electrical energy, in combination, a reactor including a control coil and a reactor coil, a magnetic frame structure of magnetic material having a plurality of circuit paths, said coils being mounted on two paths having different reluctances, electronic means connected in circuit relation with the control coil, and a dynamo-electric machine having its armature winding connected in circuit relation with said electronic means, whereby the flux density of the path carrying the control coil may be varied as a function of the demand of said machine, a path of the magnetic frame connected in parallel with the path carrying the reactor coil being so dimensioned that it becomes saturated when the current demand of said machine exceeds a given value whereby the reactance of the reactor coil is rapidly varied, said reactor coil being interconnected with said electronic means to limit the current transmitted by the electronic means to a safe value therefor.

7. In a system of control for a direct current motor, in combination, a motor having an armature winding, a source of alternating current, electronic means for supplying direct-current to said motor armature winding from said source of alternating current, a reactor having a coil connected in circuit relation with said motor armature, a second coil, and magnetic circuits for said coils so dimensioned that the reactance of the second coil is changed a material extent only when the current demand of the motor exceeds a given value, and means responsive to the change of reactance of the second coil to control said electronic means to limit the current transmitted by said electronic means.

8. A system of control for dynamo-electric machines, in combination, a direct-current motor having an armature winding and a field winding, a source of alternating current, grid-controlled electric discharge devices adapted to supply direct-current to said armature winding from said source of alternating current, and a phase-shift circuit for controlling the grid potential of said electric discharge device, said phase-shift circuit including a pair of reactors of substantially equal reactance during normal loading of said motor and of a difference in reactance when the loading of said motor tends to be abnormal, whereby an excessive current is prevented.

9. A system of control for dynamo-electric machines, in combination, a direct-current motor having an armature winding and a field winding, a source of alternating current, grid-controlled electric discharge devices adapted to supply direct-current to said armature winding from said source of alternating-current, and a phase-shift circuit including a reactor of substantially constant reactance and a second reactor, designed to have its reactance decreased when the motor armature current tends to increase to an abnormal value, whereby the current through said discharge devices is prevented from rising above a certain value.

10. A system of control for dynamo-electric machines, in combination, a direct-current motor having an armature winding and a field winding, means for exciting the field winding at a substantially constant value, an electric discharge device, having a control grid, a cathode, and an anode, adapted to control the value of the direct-current supplied to said armature winding, a phase-shift circuit for the said grid including a three-core reactor, one of the cores being energized by the armature current of the motor and another core carrying a reactor coil and the third core being so interconnected with the core energized by the armature current that it will become saturated before the third core becomes saturated, whereby the reactance of the reactor coil is decreased to thus prevent an excessive rise in current passing through the discharge device.

11. A system of control for dynamo-electric machines, in combination, a direct-current motor having an armature winding and a field winding, a source of alternating current, means for exciting the field winding at a constant value, an electric discharge device adapted to energize said armature winding with direct current from said source of alternating current, and a phase-shift circuit for controlling the discharge device, said phase-shift circuit including a device responsive to abnormal armature currents to protect said discharge device against excessive discharge currents.

12. In combination with a system of control for a direct-current motor supplied with direct current from a source of alternating current through an electric discharge device, a phase-shift reactor for the discharge device having a main core energized by the current of the motor, a pair of cores of low reluctance adapted to be energized from said main core, a second pair of cores of high reluctance adapted to be energized from said main core when said first pair of cores have become saturated, and means for controlling the discharge device when said second pair of cores becomes saturated.

ALLAN D. FORBES.